United States Patent Office 3,292,914
Patented Dec. 20, 1966

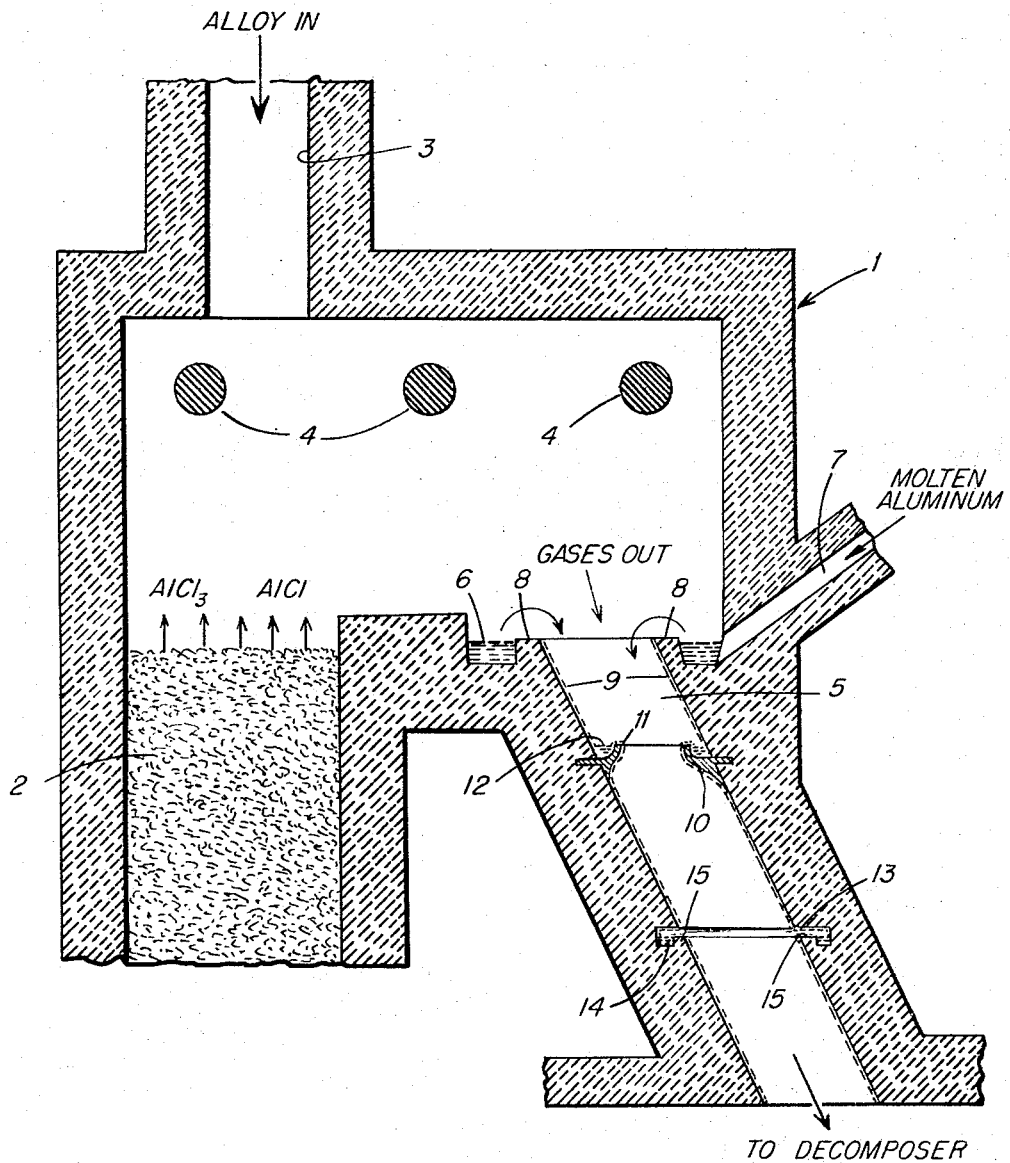

3,292,914
PREVENTING BLOCKAGE IN APPARATUS FOR
MONOHALIDE REFINING OF ALUMINUM
Frederick William Southam, Arvida, Quebec, Canada,
assignor to Aluminium Laboratories Limited, Montreal,
Quebec, Canada, a corporation of Canada
Filed Jan. 8, 1964, Ser. No. 336,460
7 Claims. (Cl. 266—9)

The present invention relates to means and process for preventing blockages in apparatus for the monohalide refining of aluminum, and more particularly to means for preventing such blockages in a generally vertically directed gas transfer pipe extending from a converter to a decomposer, both of which form parts of the apparatus used in the monohalide refining process for aluminum. The invention will be particularly described as applied to the monochloride and trichloride of aluminum.

In this process as now generally practiced, relatively impure aluminum or aluminum alloy is supplied to a converter along with aluminum trichloride (AlCl₃). The temperatures in the converter are kept in a desired elevated temperature range as is now commonly known in the art and a reaction occurs as follows:

$$2Al + AlCl_3 = 3AlCl$$

This process occurs to a substantial extent in the converter, but not to the extent of using up all the aluminum trichloride introduced thereto. As a result, aluminum monochloride plus aluminum trichloride gases pass from the converter to a decomposer where the reverse reaction takes place substantially as follows:

$$3AlCl = 2Al + AlCl_3$$

The AlCl₃ from the decomposer is then purified and raised to the desired temperature, whereupon it is recirculated to the converter.

It has been found in the practice of this process that some solid particles of impurities tend to be carried along in the gas stream from the converter. These solids in the gas appear to be in part alumina, probably caused by water, admitted as moisture with the solid charge material (impure aluminum or aluminum alloy) when the latter is introduced into the converter, such moisture being in effect a source of oxygen, reacting with some of the aluminum or aluminum compounds in the converter to yield aluminum oxide (Al₂O₃), which is carried away in fine particle form and which deposit on and adhere to the walls of the gas passages.

As the reactions within the converter are endothermic, it is necessary to supply heat thereto. In some instances the heat necessary to supply the endothermic reaction heat for the converter may be generated therein by passing a current between electrodes extending into the converter and into contact with the solid charge therein. In as much as these electrodes may conveniently be of carbon, some carbon is thereby introduced into the converter and may react with aluminum monochloride therein to form aluminum carbide. This material also causes difficulty, in that it is also carried away in the form of particles in the gas and tends to adhere to the walls of the gas passages.

In spite of precautions taken to avoid decomposition of aluminum monochloride in the gas passages, some decomposition tends to occur and molten aluminum deposits on the walls of the passages; this molten aluminum appears to act as a "glue" for the solid particles carried in the gas stream.

It has been found these two reactions, or such other reactions as may occur within the converter, or both, cause solid materials to build up on the walls of the gas passages from the converter to an extent such that the passages are first constricted and eventually become wholly blocked.

The present invention comprises the provision of means and process for avoiding such blockages; and in its simplest form comprises means for supplying molten aluminum as a liquid film flowing on the walls of the gas outlet passage leading from the converter to the decomposer. In the event that this passage is disposed substantially vertically and irrespective of the cross-sectional shape of the passage itself, this flowing of molten aluminum on the walls is a relatively simple matter, as all that is necessary is that suitable means be provided to supply the aluminum in a molten state to the upper end portions of these walls, so that it will flow downwardly thereover and wash the solid materials into a decomposer, where they can be relatively easily removed and eventually disposed of. The mode of such removal and disposition form per se no part of the present invention.

In some embodiments of the invention, however, particularly where the gas passage in question is inclined, or even horizontal, it is desirable and sometimes necessary to provide means by which the flow of molten aluminum on the walls of the gas outlet passage from the converter may be maintained so as to substantially completely cover the walls and wash all portions thereof.

One or more nozzles, depending on the length of passage to be washed, is positioned in the gas passage to direct a spray of molten aluminum onto the walls thereof—preferably in the direction of gas flow—to maintain thereon a substantially continuous film of flowing molten aluminum. In the case of inclined passage, a substantially continuous film of molten aluminum may be maintained by directing the metal against the walls of the uppermost portion of the passage. Some refractories are wetted by molten aluminum, and in such a passage, the wetting action may afford the desired continuous film without the use of redistributing means positioned in the passage. Otherwise, additional means may be provided for redistributing the flow of molten aluminum, two such means being disclosed herein, in the single figure which forms a part of this specification, which may be used in conjunction with one another and/or either of which may be used individually, and either or both may be duplicated to a desired extent, depending upon the length and disposition of the passage in question in a particular installation.

One embodiment of these redistributing means comprises an inwardly directed ledge providing an annular trough around the center portion of the passage and providing for the spill-over of molten aluminum, which collects in the trough and is redistributed thereby around the passage, so that the molten aluminum will flow more uniformly in the next portion of the passage below such means. Another embodiment of these redistributing means comprises an annular groove around the passage in question having at its inner end portion or periphery a trough for molten aluminum which redistributes this material, so as again to give a uniform flowing film of the molten aluminum substantially coating and washing the entire inside of the passage therebelow to a maximum extent.

The embodiments of the invention hereinabove generally referred to will be better understood from the accompanying drawing, wherein the single figure illustrates in somewhat diagrammatic form and generally substantially in vertical section a portion of a converter with a gas passage leading therefrom which communicates with a decomposer (not shown).

Referring now to the drawing, the converter is illustrated generally at 1 and is provided with a shaft portion 2 for containing a body of solid material as shown. This solid material, consisting essentially of impure aluminum or aluminum alloy, may be supplied through a passage 3 from above, which it will be understood is kept closed to the atmosphere to a maximum extent, the impure aluminum being introduced in a manner so as to minimize the introduction of air into the converter, although as indicated above it appears difficult to avoid carrying some small amount of adsorbed or other moisture with the solid charge material into the reaction zone.

The lower end portion of the shaft 2 is constructed in a manner not herein illustrated to permit the introduction thereto of heated aluminum trichloride ($AlCl_3$) in gaseous form and also to permit of the withdrawal periodically or continuously as may be desired of residue from which all or substantially all of the aluminum has been removed. The gases percolate up through the bed of solid material in the shaft 2 of the furnace and pass out the top thereof as a mixture of aluminum monochloride and aluminum trichloride. Heat may be provided to the shaft 2 and the solid material therein in any suitable way as by one or more electric resistors 4 as shown and/or by passing a current through the body of solid material in the shaft between electrodes (not shown) extending into the shaft 2 in a manner which is now known in the art.

The gases pass from the upper portion of the converter, which is shown in the drawings, outwardly through a generally vertically and downwardly directed passage 5. This is a passage where clogging or blockages tends to occur and where the solid materials such as alumina, aluminum carbide, etc. tend to collect on the walls, adhering thereto and ultimately building up such a deposit as to constrict the passage 5 and even to block it altogether.

The present invention avoids such blockages and removes materials which adhere to the walls of passage 5 as well as preventing such deposits by the washing action of the molten aluminum film. For this purpose there is provided an annular trough 6 formed around the entrance to the passage 5 for gases from the upper portion of the converter. This trough may be supplied with molten aluminum through an inclined passage 7 from any suitable source, such, for example, as the decomposer (not shown in the present drawing). Any suitable means, e.g., a Refrax piston pump, may be provided for supplying the molten aluminum to the passage 7, the details of which are per se no part of the present invention. Molten aluminum overflows the inner annular wall 8 of the trough 6 and flows down the walls of the passage 5 as shown at 9, collecting or picking up solid material as it tends to deposit on these walls, so that the solid material is carried along by and with the molten aluminum stream downwardly into the decomposer, wherein it is feasible and practicable to separate the undesired solids from the desired molten aluminum.

If the wall 8 is not exactly uniform and even if the passage 5 is arranged substantially vertical as distinguished from the inclined arrangement shown in the accompanying drawing, it is often found desirable to provide at one or more levels below that of the upper end of the passage 5 a means for redistributing the molten aluminum, so as to have it cover as a flowing film a large part, if not all, of the walls of the passage 5.

For this purpose two different types of means are shown in the drawing, either or both of which may be used in any particular installation; and either or both of which may be duplicated to a desired extent, if it is desired that several redistributions of the flowing film of molten aluminum should be carried on at various levels along the passage 5.

As shown, the upper means in the accompanying drawings comprises an inwardly directed annular member 10 suitably secured in the wall of the passage 5 and preferably provided with an upstanding inner flange 11 providing an annular trough 12 between the flange 11 and the side walls of the passage 5. The cross-sectional shape of the passage 5 or of the member 10–11 is relatively immaterial, the principle being applicable not only to round and oval, but also to rectangular and/or straight-sided passages. In any event the molten aluminum collecting in the trough 12 overflows the upstanding inner flange 11 as shown and tends more evenly to redistribute the molten aluminum around a part at least of the passage walls. Herein passage 5 is constructed from alumina block and the wetting action of the molten aluminum tends to flow the molten aluminum along all the wall surface. The member 10 may be made of any suitable material which will be usable at the temperatures in question and which will not contaminate the molten aluminum.

Another means for redistributing the molten aluminum is that shown at a lower level, wherein an annular slot 13 is formed in and extending into the walls defining the passage 5, this slot terminating at its outer periphery in an annular trough portion 14 into which the aluminum flows and which serves to redistribute the molten aluminum. The trough portion 14 is thus separated from the inside passage 5 by an annular wall 15 over which the molten aluminum flows, so as to run down the inside of the passage 5 as a substantially unbroken fluid film. This type of construction is more effective under some circumstances than is the type shown at 10 for inclined passageways.

Combinations of these two forms of fluid redistributing means may be made, or both may be used and either or both duplicated to a desired extent and at desired intervals spaced vertically along the passage leading to the decomposer, such as the passage 5 here shown, the number and vertical spacing of these redistributing means being a matter of design on the part of a user.

While there is herein shown and described but one principal embodiment of the present invention with two forms of fluid redistributing means in the gas outlet passage from the converter, it is recognized that other equivalents will suggest themselves to those skilled in the art from the foregoing particular disclosure.

What is claimed is:

1. In a converter for relatively impure aluminum forming a part of the apparatus used in the monohalide aluminum refining process, and wherein relatively impure aluminum and aluminum trihalide gases are supplied to the converter, aluminum monohalide and aluminum trihalide gases pass therefrom toward a decomposer, and impurities and other metals introduced into the converter with the impure aluminum are left behind in the converter;

a converter, a decomposer, and a passage for gases leading from said converter toward said decomposer, and means for preventing clogging of and blockages in said passage, comprising means for supplying a flowing film of molten aluminum about the inside walls of said passage to maintain said walls substantially free from deposits.

2. Means for preventing clogging of the outlet passage from a converter in accordance with claim 1, provided with a generally vertically directed gas passage in which said means for supplying a film of molten aluminum about the inside walls of said passage comprise an annular trough surrounding the upper end of said passage, and means to supply molten aluminum thereto, so that it will overflow said trough and flow down the walls of said passage.

3. Means for preventing clogging of the outlet passage from a converter in accordance with claim 2 further comprising an annular, liquid aluminum collecting and redistributing means disposed in said passage at least at one level below that of the upper end thereof and tending to assure that substantially all of the surface area inside said passage is covered by a flowing film of molten aluminum.

4. Means for preventing clogging of the outlet passage from a converter in accordance with claim 2 in which at least one annular liquid aluminum collecting and redistributing means is disposed at at least one level respectively in said passage below the upper end thereof for redistributing the liquid aluminum flowing down the walls of said passage and tending to assure that substantially all of the surface area inside said passage is covered by a flowing film of molten aluminum.

5. Means for preventing clogging of the outlet passage from a converter in accordance with claim 4, in which said collecting and redistributing means comprises an inwardly directed trough-forming means secured in a predetermined fixed, substantially horizontal position in said passage and providing with the walls of said passage an annular liquid-containing trough for molten aluminum, and including an annular lip defining an inner wall of said trough and over which the molten aluminum may flow to provide a molten film extending over a substantial part at least of the subjacent wall portion of said passage.

6. Means for preventing clogging of the outlet passage from a converter in accordance with claim 4, in which said liquid aluminum collecting and redistributing means comprise an annular groove formed in a substantially horizontal plane in and extending into the walls of said passage and terminating at its innermost portion in an annular, upwardly open, trough surrounding said passage.

7. Means in accordance with claim 1 wherein said gas passage is generally downwardly directed and said molten aluminum and any solid materials collected therein flow downwardly to said decomposer.

No references cited.

CHARLIE T. MOON, *Primary Examiner.*

M. L. FAIGUS, *Assistant Examiner.*